United States Patent [19]

Lapeyre

[11] Patent Number: 5,156,264
[45] Date of Patent: Oct. 20, 1992

[54] NON-DESTRUCTIVE PIVOT ROD RETENTION APPARATUS FOR MODULAR PLASTIC CONVEYOR BELTS

[75] Inventor: James M. Lapeyre, New Orleans, La.

[73] Assignee: The Laitram Corporation, New Orleans, La.

[21] Appl. No.: 777,204

[22] Filed: Oct. 16, 1991

Related U.S. Application Data

[63] Continuation of Ser. No. 586,389, Sep. 20, 1990, Pat. No. 5,058,732, which is a continuation of Ser. No. 302,542, Jan. 26, 1989, abandoned, which is a continuation-in-part of Ser. No. 270,101, Nov. 14, 1988, Pat. No. 4,934,517.

[51] Int. Cl.$^5$ ............................................. B65G 17/06
[52] U.S. Cl. ..................................... 198/852; 198/853
[58] Field of Search ............................... 198/851–853

[56]  References Cited

U.S. PATENT DOCUMENTS

| | | |
|---|---|---|
| 3,269,526 | 8/1966 | Imse et al. |
| 3,726,569 | 4/1973 | Maglio et al. |
| 4,858,753 | 8/1989 | Hodlewsky |
| 4,925,016 | 5/1990 | Lapeyre |
| 4,934,517 | 6/1990 | Lapeyre ........................ 198/852 |
| 4,949,838 | 8/1990 | Lapeyre et al. |
| 5,058,732 | 10/1991 | Lapeyre ........................ 198/852 |

*Primary Examiner*—Joseph E. Valenza
*Attorney, Agent, or Firm*—Laurence R. Brown; James T. Cronvich

[57]  ABSTRACT

An integrally molded module for forming a conveyor belt which receives a driving force from an intermeshed sprocket is disclosed. Each of the modules is suitable for being pivotally assembled and disassembled with a multiplicity of similar modules by pivot rods to construct the conveyor belt. More specifically, the pivot rods can be removed in a non-destructive manner such that they are suitable for reuse. Each of the modules includes first and second pluralities of link ends, each of which define a pivot hole and are aligned to form first and second pivot axes. The link ends of each of the modules are joined by an integrally molded connecting structure which maintains and joins the relative position of the elongated links with respect to each other. One or more stop members are also integrally molded in close proximity to the outermost link ends of one of the pluralities and partially obstructs the insertion of a pivot rod into the aperture defined in the outermost link. Consequently, to insert a pivot rod into the aligned link ends of two intermeshed modules, either the stop member(s), the pivot rod or both, must bend out of the way. Once the first rod is fully in place, the stop member(s) will prevent pivot rod from coming out during normal belt operation. However, by applying additional force, the pivot rod can be reused in a non-destructive manner to allow for the repair or replacement of modules, and the reuse of the pivot rod.

16 Claims, 6 Drawing Sheets

NON-DESTRUCTIVE PIVOT ROD RETENTION APPARATUS FOR MODULAR PLASTIC CONVEYOR BELTS

This application is a continuation of Ser. No. 07/586,389, filed Sep. 20, 1990 now U.S. Pat. No. 5,058,732 for "Apparatus to Allow Non-Destructive Removal of Pivot Rods in Modular Plastic Conveyor Belts", which is a continuation of Ser. No. 07/302,542, filed Jan. 26, 1989, now abandoned, which was a continuation-in-part of Ser. No. 06/270,101, filed Nov. 14, 1988, now U.S. Pat. No. 4,934,517.

TECHNICAL FIELD

This invention relates to a new and simple to manufacture conveyor belt modules which are pivotally connected by plastic pivot rods. More particularly this invention relates to such conveyor belts wherein the pivot rods are retained in assembled position without the need of forming "heads" on both ends of the pivot rods after the belt has been assembled. In addition, the pivot rods can be removed from the belt in a non-destructive manner and then reused. The modules are the type preferably formed by injection molding and which include first and second pluralities of pivot ends which are intermeshed with pivot ends of other modules and wherein the intermeshed pivot ends are held together by the pivot rods. In a preferred embodiment, the particular modules of this invention, are formed with resilient members which normally obstruct movement of the pivot rods through apertures formed in the intermeshed link ends, but can be resiliently forced aside during insertion and/or removal of the pivot rods.

BACKGROUND

A typical modular conveyor belt is disclosed in U.S. Pat. No. 3,870,141 issued to J. M. Lapeyre on Mar. 11, 1975. According to this patent, substantially identical modules formed by injection molding are pivotally connected to one anther to form a conveyor belt of a desired length. Each module includes a plurality of elongated elements, and each elongated element has a first pivot end and a second pivot end. The plurality of elongated elements are joined together such that the apertures defined in each of the first and second pluralities of pivot ends lie along a first and second pivot axis respectively which are parallel one to the other. The link ends of one module are intermeshed and pivotally connected by means of a pivot rod to the link ends of another module until an entire belt having the desired length is formed. Injection molded plastic belts built according to the teachings of this patent have been well received by industry and have many uses.

U.S. Pat. No. 4,051,949 issued on Oct. 4, 1977 also to Lapeyre, solved the problem of removing small and/or unstable articles from a conveyor belt without tipping over. The belt provides for a multiplicity of channels formed in the modules which receive the "teeth" of a comb to receive the articles. The belt disclosed in U.S. Pat. No. 4,171,045, also issued to Lapeyre, is similar to that of the U.S. Pat. No. 3,870,141 and U.S. Pat. No. 4,051,949 discussed above, except that selected ones of the vanes include a plurality of "dogs" which extend above the normal portion of the conveying surface to contact and push articles on the conveying surface along such that the belt will not slip underneath.

In a similar manner, U.S. Pat. No. 4,213,527 issued Jun. 22, 1980 to J. M. Lapeyre, et al, further discloses a module for forming a link conveyor belt which has ridges or flight members extending transverse to the direction of travel for preventing the conveyor belt from slipping under articles riding on the conveyor belt surface. Similarly, U.S. Pat. No. 4,170,281 issued on Oct. 19, 1979 and U.S. Pat. No. 4,080,842 issued on Mar. 22, 1978, both to Lapeyre, also show conveying belts having members extending transverse to the conveying surface for moving articles on the conveying surface along the belt such that the belt cannot slip underneath the article.

Other modular link conveyor belt patent applications or patents by J. M. Lapeyre and/or owned by the same assignee as the present invention include Ser. No. 483,210 entitled "Link Chain Belt" filed Apr. 14, 1983, and Ser. No. 179,523 entitled "Modular Center Drive Conveyor Belt" filed Aug. 19, 1980. More specifically, application Ser. No. 118,309 which is a "Continuation" of Ser. No. 179,523 is directed to a separate "stop" or abutment member which prevents the pivot rod from moving axially out of the intermeshed link ends. Another Lapeyre patent is U.S. Pat. No. 4,556,142 entitled "Lightweight Modular Conveyor Belt" issued Dec. 3, 1985.

In addition, a patent application entitled "End-to-End Molded Conveyor Belt Module" filed Oct. 15, 1987 and having Ser. No. 110,109 discloses modules which may be "end-to-end" molded.

Another conveyor belt designed particularly for changing horizontal directions for flexing is disclosed in U.S. Pat. Nos. 4,153,152 and 4,184,588 also issued to J. M. Lapeyre on May 8, 1979 and Jan. 22, 1980 respectively.

U.S. Pat. No. 4,709,807 issued to Poerink on Dec. 1, 1987 discloses the use of pegs and/or dowels as closing on "stop" devices which are inserted in the outboard sleeve type link ends to prevent the transverse pivot rods from coming out.

In a similar manner, Maglio et al disclosed in U.S. Pat. No. 3,726,569 issued Apr. 10, 1973, the use of various types of end plugs which either cut into or are received into the "sleeve" member to prevent the connecting rod from working its way out.

The "All-in-One"(®) conveyor belt manufactured by the KVP Company in Sacramento, California and illustrated in FIG. 4 of U.S. Pat. No. 4,742,907 issued May 10, 1988 to Karl V. Palmaer, is a modular plastic belt driven at a central transverse connecting member which can be brick-layed, and therefore can be provided in different widths.

A plastic modular belt sold by the Cambridge Wire Cloth Company of Cambridge, Maryland under the name of Cam-Clean (®) and substantially described in U.S. Pat. No. 4,557,374 issued on Dec. 10, 1985 to Robert H. Bode is driven in the center area of a module by a sprocket tooth received by a recess in the module defined by a pair of transverse connecting members.

Finally, the Rexnord Corp. of Milwaukee, Wisconsin has recently introduced a group of plastic conveyor belts designated as the "5900" series which uses individual and separate snap-in plugs to retain "headless" pivot rods in position.

Thus, a review of the prior art patents and commercial belts as well as pending applications of the assignee of the present invention reveals that to date there has not been an easy, simple and inexpensive technique for maintaining the pivot rods in position in assembled modular conveying belts. More particularly, none of the prior art conveying belts are capable of being repaired or assembled by non-destructive removal of the pivot rods, except for those which require separate abutment or "stop" members which must be individually inserted at each pivot rod. Therefore, it is an object of this invention to provide conveyor belts wherein the modules can be repaired or disassembled without destruction of the pivot rod, and thereby allow reuse of the pivot rods.

It is another object of the present invention to provide a module for forming a conveyor belt which is modular and has the inherent capability of being easily repaired and replaced.

It is also an object of the present invention to provide a conveyor belt which is simple, easy, and inexpensive to construct and does not require separate "plugs" to retain the pivot rods in position.

DISCLOSURE OF THE INVENTION

Other objects and advantages will be obvious, and will in part appear hereinafter and will be accomplished by the present invention which provides an integrally molded module for forming a conveyor belt of a plurality of such modules which are pivotably connected. The modules are preferably formed by the injection molding of a plastic material such as polyethylene, polypropylene, or acetal. Each module includes first and second pluralities of link ends joined by a connecting structure integrally molded with the link ends. Each link of the first and second pluralities of link ends defines a pivot aperture of a selected diameter and the pluralities of pivot apertures in turn define first and second pivot axes. In one preferred embodiment of this invention the first plurality of link ends are offset one link width with respect to the second plurality of link ends. The length of each module is determined by the distance between the first and second pivot axis, and the width of the module is determined by the number of link ends joined together by the centrally located connecting structure or member. Since the first and second pivot axes defined by the first and second pluralities of link ends are parallel, these axes lie in a common plane. The thickness of each of the pivot ends which surrounds the pivot axis is less than the spacing between adjacent pivot ends so that the pivot ends of one module by be intermeshed and connected with the pivot ends of another module by means of a pivot rod when the pivot axis of the two modules are aligned coaxially.

One or more stop members are also integrally molded proximate to the outermost link end of one of the pluralities of link ends such that is partially obstructs the insertion of a pivot rod into the aperture defined in the outermost link end. This means that a pivot rod having a diameter which is substantially the same diameter as the aperture in the link end, but slightly less, or the stop member(s) or both must be deformed or forced out of the way sufficiently to allow a pivot rod to be inserted through the aligned apertures of the intermeshed link ends. Once the pivot rod is fully in place and has passed the stop member(s), the stop member(s) will also prevent the pivot rod from moving out of a connecting relationship with the intermeshed link ends during normal belt operation. However, the pivot rod can be removed in a non-destructive manner by applying additional force axially to the pivot rod such that the pivot rod, the stop member(s) or both are again forced aside during such removal.

BRIEF DESCRIPTION OF THE DRAWINGS

The above features of the present invention will be more clearly understood from consideration of the following description in connection with accompanying drawings in which.

BEST KNOWN MODE FOR PRACTICING THIS INVENTION

Figure 1:
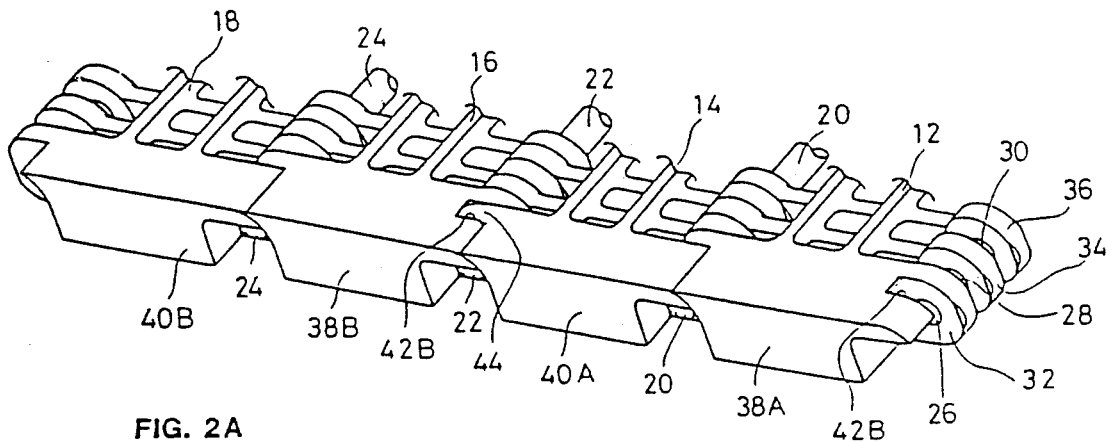
FIG. 1 is a perspective view of a plastic modular conveyor belt incorporating the features of this invention.
Figure 2A:
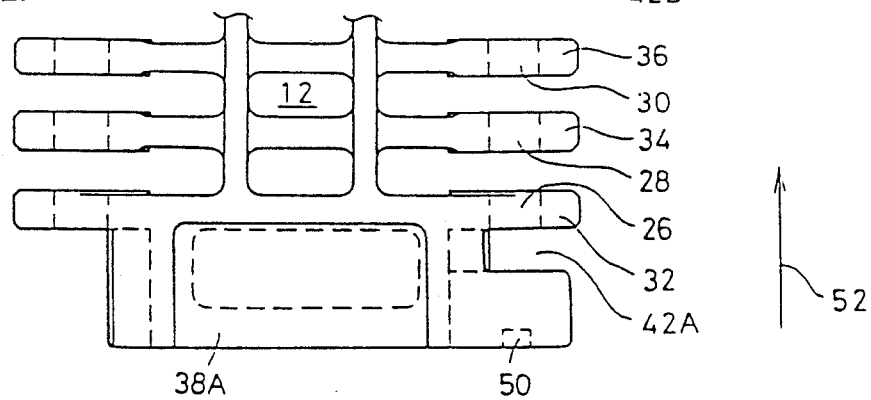
FIGS. 2A, 2B, 2C and 2D are top, side bottom and front views respectively of the module of FIG. 1.
Figure 2B:
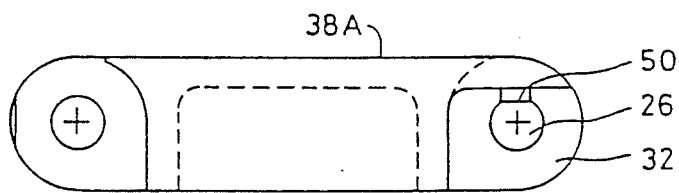
Figure 2C:
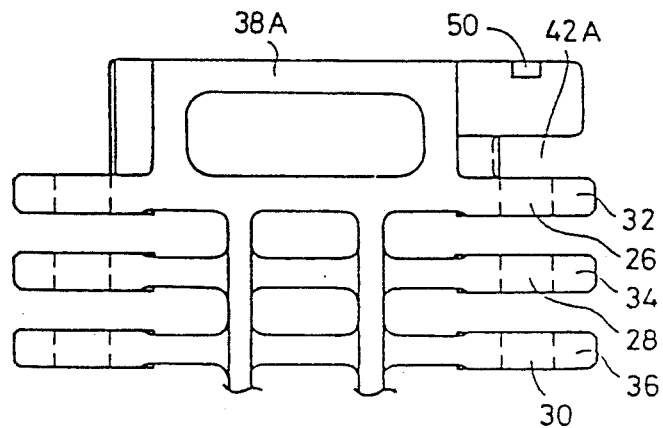
Figure 2D:
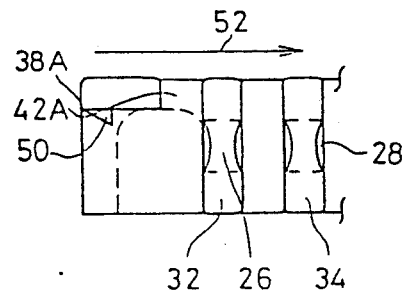

Referring now to FIG. 1, there is shown generally at 10 a section of a plastic modular conveyor belt which incorporates the features of this invention. FIGS. 2A, 2B, 2C and 2D are various views of a module 12 of belt 10. As shown in FIG. 1, a series of modules 12, 14, 16 and 18 are pivotally connected or joined by means of pivot rods 20, 22 and 24 which extend through apertures such as apertures 26, 28 and 30 defined in the end of elongated links 32, 34 and 36 of module 12. The modules 12 through 18 as shown in FIG. 1 are illustrated with only three elongated links such as elongated links 32, 34 and 36 of module 12. However, it will be appreciated that a belt typically could be substantially wider than three elongated links, and each module could have a significantly larger number of elongated links such as for example on the order of twenty or more elongated links. Thus, fabrication of a belt by using modules already preassembled in this manner is substantially easier than if the links were not connected. It should also be noted that, although substantially similar, modules 14 and 18 are not exactly the same as modules 12 and 16. Specifically, the edges 38A and 38B of modules 12 and 16 are somewhat wider than edges 40A and 40B of module 14 and 18. Further edges 38A and 38B of modules 12 and 16 include spaces 42A and 42B to receive the link end of a pivotally connected module, such as link end 44 of module 14 is received by space 42B of module 16. The difference in thickness allows for a straight and smoother edge. Other than the space and increased thickness, modules 12 and 16 are the same as modules 14 and 18.

It will be understood by those skilled in the art that conveyor belts are required to be in all sizes of width and length, to accomplish various types of conveying needs. Consequently, it is highly desirable that the belting system be made of modules or units which can be placed together in an end-to-end and side-by-side relationship so as to form a belt of any width and length.

Figure 3:
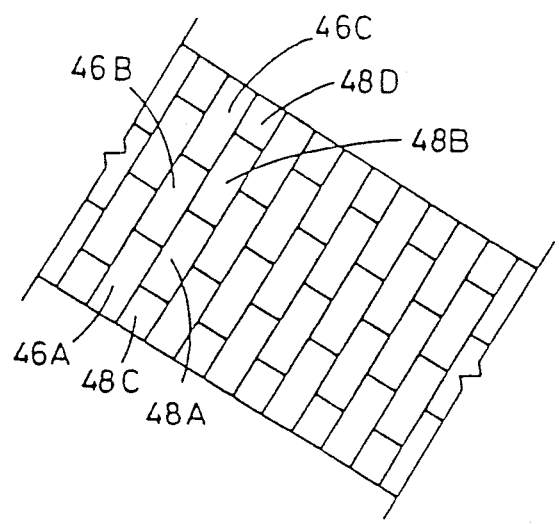
FIG. 3 is a diagrammatic sketch showing how the belt of this invention may be brick-layed to form a belt of any selected width.

FIG. 3 illustrates how belts made of modules of the types discussed above may be made of identical modules having a single width along with a few partial or half modules so as to form a belt three modules wide but which also has substantially the strength of a single module across the belt. The strength of the belt is achieved as a result of the intermeshing and interlocking of the pivot ends. As shown, the full length modules 46A, 46B and 46C are simply laid side-by-side across the width of the belt. Each row on both sides of the row comprised of modules 46A, 46B and 46C include two full size rows such as modules 48A and 48B and two partial modules such as 48C and 48D. When this bricklayed pattern is continued for the length of the belt, the belt has substantially more strength across its width than it would without the brick-laying.

Figure 4:
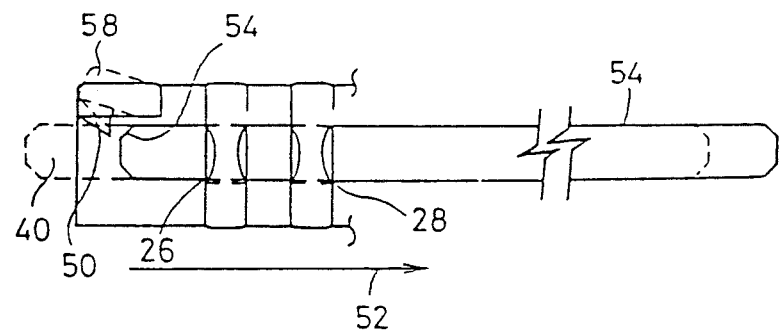
FIG. 4 is a front view similar to FIG. 2D showing a "headless" pivot rod in place.

Referring again to FIGS. 2A through 2D, there are shown the top, side, bottom and front views respectively of module 12 from FIG. 1. Although, the remaining discussion of this embodiment will be with reference to modules similar to module 12, it should be understood that the discussion is equally applicable to modules of the type bearing reference numbers 14 and 18. As shown, edge portion 38A which is integrally molded to elongated link 32 includes a stop member 50. As can be seen, stop member 50 extends from the top surface of edge 38A such that it partially obstructs aperture 26 which is defined in elongated link 32. Consequently, before a pivot rod can be inserted in the direction of arrow 52 through the aligned aperture of module 12, such as apertures 26, 28 and 30, and the apertures of the intermeshed link ends of another module, stop member 50, the pivot rod or both must be deformed or bent out of the path of the pivot rod. FIG. 4 is substantially the same as FIG. 2D, except it shows a pivot rod 54 having a diameter substantially the same size (although slightly smaller) in place within the apertures 26 and 28. As can be seen, the tip portion of stop member 50 would contact edge 56 of pivot rod 54 and prevent, or at least restrict, the movement of the pivot rod in the direction opposite of that indicated by arrow 52. The dotted lines 58 in FIG. 4 illustrate how the stop member 50 could allow pivot rod 54 to be forcefully inserted (or removed) by being deformed by the end of the pivot rod indicated by dotted lines 60.

Figure 6A:
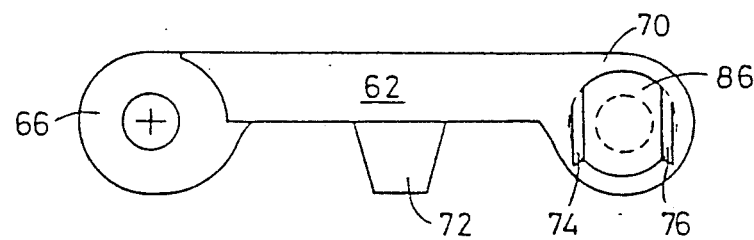
FIGS. 6A and 6B are side and front views respectively which are similar to FIGS. 5B and 5D except they include a "headed" pivot rod snapped in place.
Figure 6B:
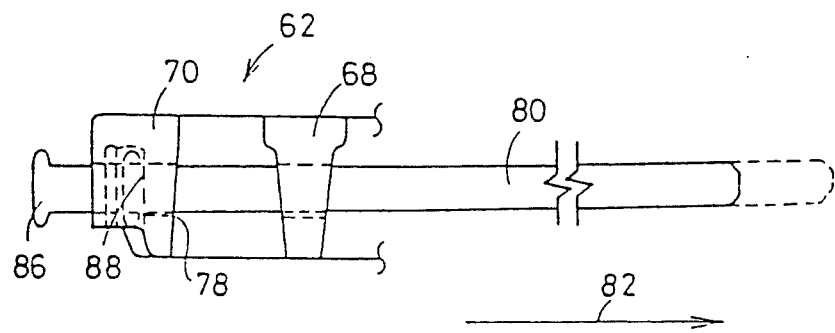
Figure 5A:
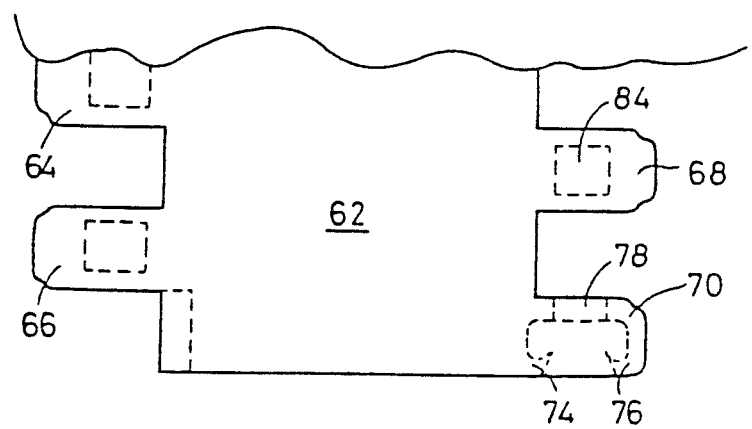
FIGS. 5A, 5B, 5C and 5D are top, side, bottom and front views respectively of a different embodiment of a module incorporating the teachings of this invention.
Figure 5B:
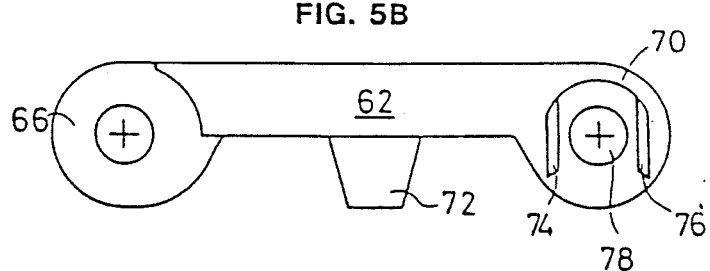
Figure 5C:
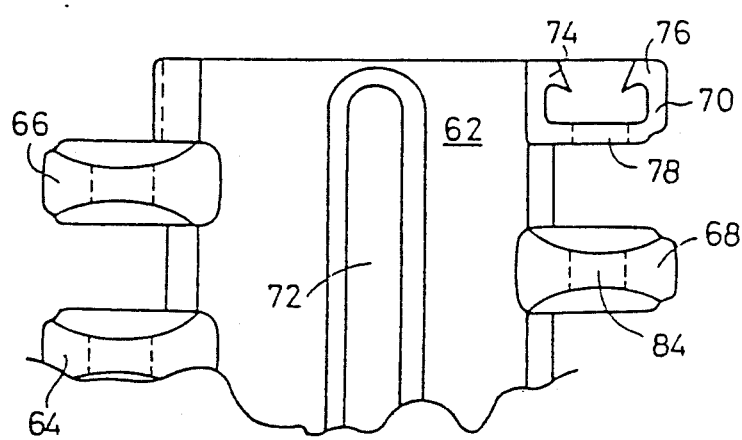
Figure 5D:
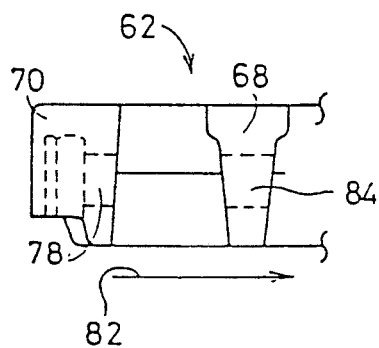

Referring now to FIGS. 5A, 5B, 5C, 5D, 6A and 6B, there are shown various views of another embodiment of the present invention on a different type of module indicated generally at 62. As shown, link ends 64 and 66 on one side of the module are offset from the link ends 68 and 70 on the other side of the module by an amount equal to or slightly greater than the thickness of a link end. This amount of offset in the link ends makes the task of providing aligned edges of connected link ends much easier. As will be appreciated by those skilled in the art, a conveyor belt constructed from modules similar to module 62 will be center driven by applying a force orthogonal to cross-member 72, and will have a flush, smooth top. Also, as can be seen link end 70 includes two ramp shaped stop members 74 and 76 which obstruct aperture 78 formed in link end 70. Stop members 74 and 76 will freely allow a pivot rod 80 (FIG. 6B) to be inserted in the direction indicated by arrow 82 through apertures 78 and 84 in link ends 70 and 68 respectively as well as through apertures of intermeshed link ends from another module. However, as can be seen in FIGS. 6A and 6B, stop members 74 and 76 will obstruct the passage of the head 86 such that these stop members must be deformed or bent out of position before head 86 can move past stop members 74 and 76 to the seated position indicated by dotted lines 88. And, as will be appreciated, once fully seated, head 86 and consequently the whole pivot rod 80 will be restricted from moving in a direction opposite that indicated by arrow 82 during normal operation of the belt. Of course the pivot rod 80 can be removed by either forcing head 86 past stop members 74 and 76 or by simply cutting head 86 from pivot rod 82.

Figure 7A:
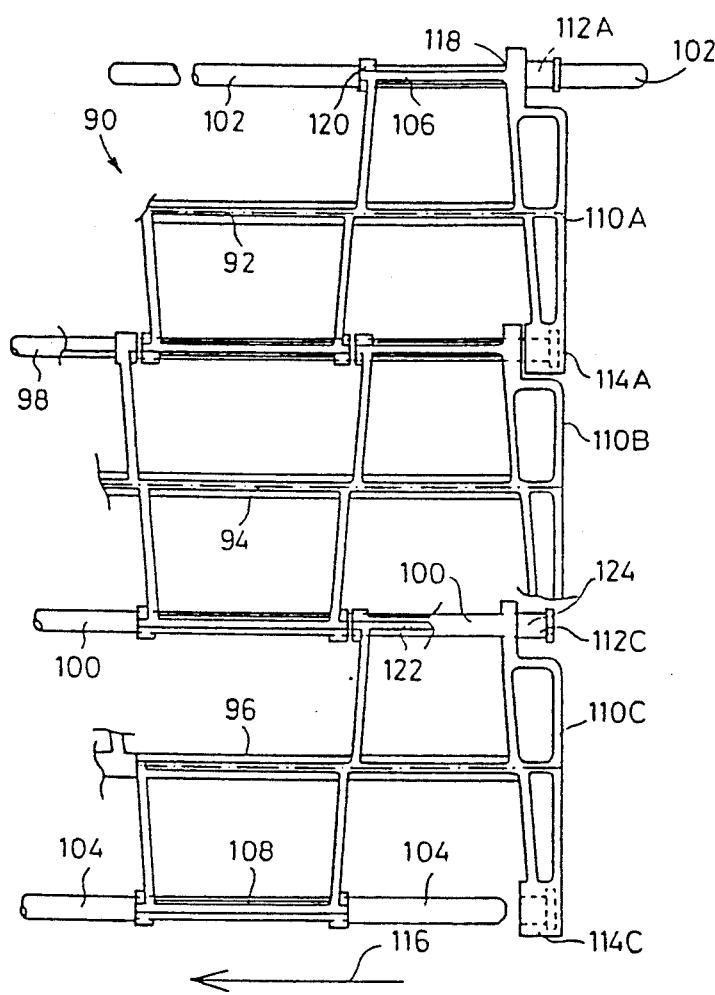
FIG. 7A is a partially sectional top view of another embodiment of the present invention, particularly suitable for open area belts.
Figure 7B:
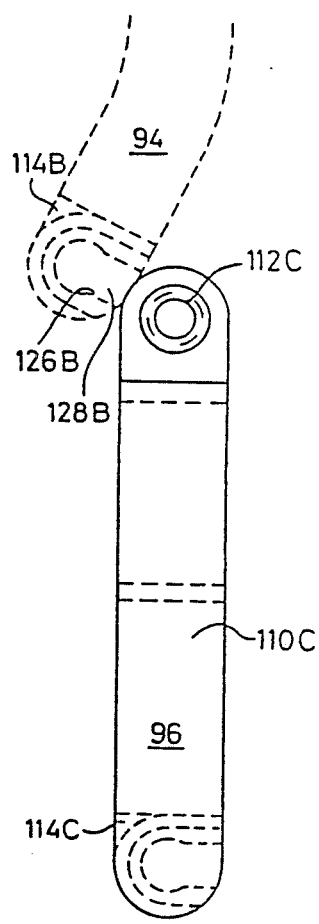
FIG. 7B is a side view of the modules of FIG. 7A.
Figure 7C:
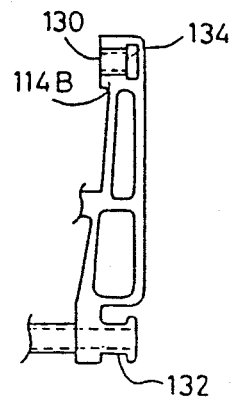
FIG. 7C is a bottom view of a portion of one of the modules of FIG. 7A.

Referring now to FIGS. 7A, 7B and 7C there is shown still another embodiment of the present invention incorporated unto a module used in fabricating very light weight and open area conveyor belts, such as the portion of a conveyor belt indicated generally at 90. As shown, the belt 90 includes integrally molded modules 92, 94 and 96 typically connected by pivot rod 98 and 100. To aid in understanding this embodiment, pivot rods 102 and 104 are also shown in position in link ends 106 and 108 of modules 92 and 96 respectively, but are not shown as connecting other modules. As shown, edge members 110A, 110B and 110C are integrally molded to each module. Each edge member 110A, 110B and 110C includes a support structure such as sleeve portion 112A and 112C, and an obstruction abutment or stop member such as 114A and 114C. In the embodiment as shown, modules of belt 90 are assembled by inserting the pivot rod through the intermeshed link ends in a direction as indicated by arrow 116. However, as will become clear hereinafter, the stop member portion of a module edge must be deformed or bent out of the way to allow insertion of the pivot rod into and through the sleeve portion and the link ends. As shown, in FIGS. 7A and 7B, the obstruction portion, abutment or stop member of a module edge is bent or deformed out of the usual position, and a rod such as rod 102 is passed through a sleeve and the link end, such as sleeve 112A and apertures 118 and 120 of link end 106, in the direction indicated by arrow 116. Once the rod is fully inserted in position, the step member or abutment portion of the adjacent module returns to its normal or undeformed position surrounding the sleeve portion so as to prevent the rod from moving in a direction opposite that indicated by arrow 116. This is indicated by abutment or stop member portion 114A of module 92, surrounding the sleeve portion (not visible) of edge 110B of module 94 to prevent pivot rod 98 moving out of its connecting position. The broken out area of link 122 of module 96 and dashed lines 124 show how pivot rod 100 may extend substantially to the end of sleeve 112C such that it would be almost in contact with the stop member portion (broken away and not shown) of edge 110B of module 94. On the other hand, it can be seen that the pivot rod may terminate well short of the abutment or stop member without detrimental effect as is indicated by pivot rod 104 and abutment or stop member 114C. FIG. 7B illustrates how the abutment or stop member portion 114B of module 94 may be bent out of the way of sleeve portion 112C of module 96, and how the obstruction, abutment or stop member portion 114B includes a keyhole shaped cut-out proving a passage 126B from the bottom-most edge portion 128B of edge 110B such that the obstruction or stop member portion 114B can snap around and surround the sleeve 112C when it returns to its normal and undeformed position. As can better be seen from the bottom view of FIG. 7C, the cylindrical receiving recess portion 130 indicated by dotted lines is substantially the same diameter, or somewhat greater than the diameter of the sleeve portion 132 of the same and other modules. The cut-out or passageway to the cylindrical portion, such as passageway 134 and passage 126B of module 94, however, is equal to or slightly less than the diameter of the sleeve 112C of module 96 such that the stop member portion 114B of module 94 snaps around and surrounds the sleeve portion 112C of a pivotally connected module 96. Thus, it can be seen that according to this embodiment, a smooth edge is provided and headless pivot rods are completely restrained from axial movement out of a connecting relationship without the use of separate or unattached plugs and/or obstructions.

Figure 8A:
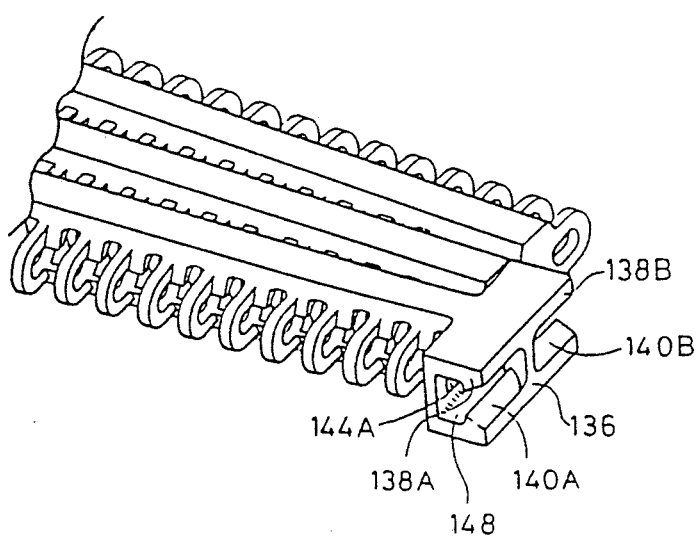
FIG. 8A is a perspective view of three intermeshed modules of another embodiment of the present invention.
Figure 8B:
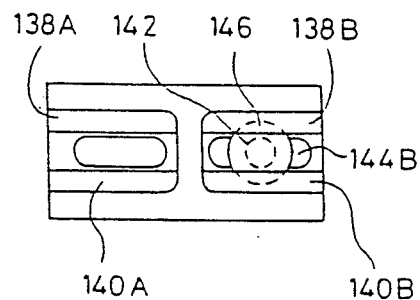
FIG. 8B is a side view of a module of FIG. 8A.

Referring now to FIGS. 8A and 8B, there is another type of module which shows yet another embodiment of the present invention. As shown, the edge 136 of a selected module includes top ram shaped abutments or stop members 138A and 138B, and bottom ramp shaped abutments or stop members 140A and 140B. As can also be seen, the body 142 of a pivot rod can easily pass the stop members 138B and 140B into aperture 144B, whereas the head 146 must be forced past stop members 138B and 140B so as to be seated in the gap 148A or 148B between the stop member and the edge portion defining aperture 144A and 144B. Once the head 146 is in position in gap 148B the pivot rod is substantially restricted from any axial movement.

Figure 9A:
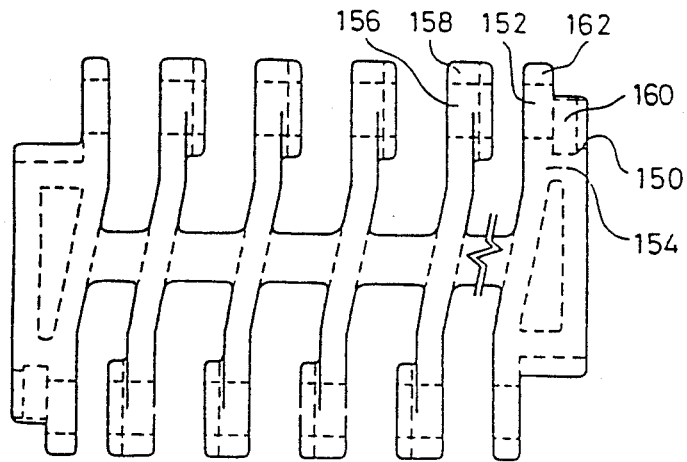
FIGS. 9A and 9B are top and side views respectively of another embodiment of the present invention.
Figure 9B:
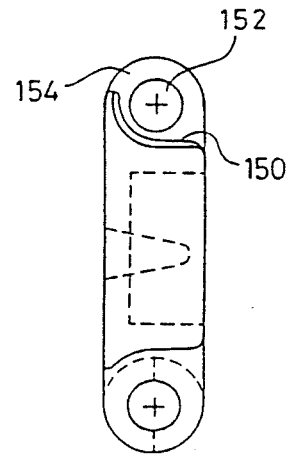
Figure 10:
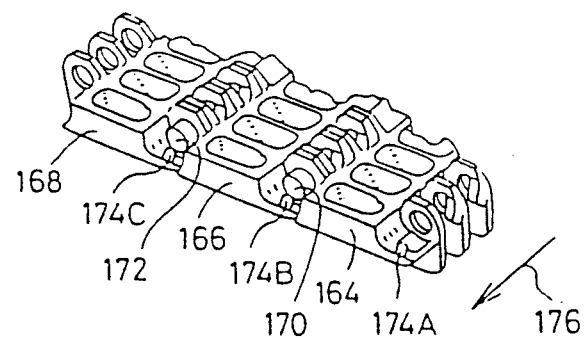
FIGS. 10, 11A, 11B and 11C show a perspective view, a side view, a front view and a top view respectively of another embodiment of this invention.

FIGS. 9A and 9B show top and side views of yet another embodiment of the invention. As shown, a curved ramp shaped abutment 150 will allow the passage of the body of a pivot rod into aperture 152 of side link 154 and on into through the apertures defined in the link ends such as aperture 156 in link end 158. However, the enlarged head of a pivot rod must be forced past stop member 150 into the gap 160 between the surface 162 of side 154 and stop member 150. Once in place, the "headed" rod is restrained from any axial movement.

Figure 11A:
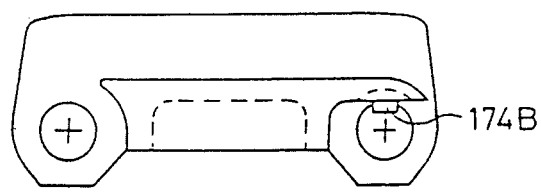
Figure 11B:
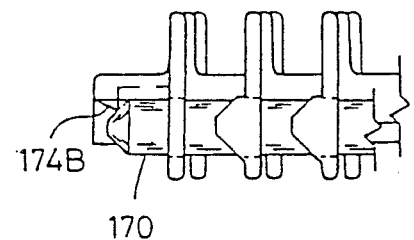
Figure 11C:
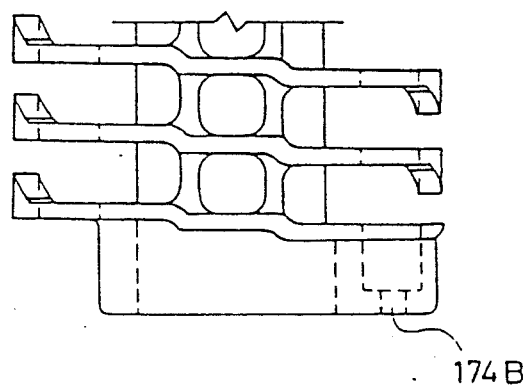

FIGS. 10, 11A, 11B and 11C show yet another belt style incorporating the features of this invention. As shown, modules 164, 166 and 168 are pivotally connected by "headless" pivot rods 170 and 172. Also, as can be seen a ramp shaped abutment or stop member, such as stop members 174A, 174B and 174C, partially obstruct insertion of a pivot rod into the apertures of the link end in close proximity to the stop members. Thus, either the pivot rod, the abutment, or both must be deformed to allow the pivot rod to be inserted into the apertures of intermeshed link ends of two modules. Once in place, the abutment will restrict or inhibit axial movement of the pivot rod in a direction indicated by arrow 176 out of the apertures of the intermeshed link ends during normal operation. Of course, the pivot rod may be forced or pushed past the stop members. FIGS. 11A, 11B and 11C show other views of the module 164.

Thus, although there has been described to this point particular embodiments of modules for forming conveyor belts which modules incorporate a stop means for retaining a pivot rod so that the pivot rods can be removed in a non-destructive manner, it is not intended that such specific references be considered as limitations upon the scope of this invention except in-so-far as set forth in the following claims.

I claim:

1. In a modular plastic conveyor belt comprising a plurality of modular links pivotably connected end-to-end by means of pivot rods extending axially through the apertures in intermeshed link ends on the end-to-end links, improved link end structure for reacting with the pivot rods, comprising in combination,
a pivot rod retaining member integrally part of one of the end-to-end links providing a flexibly deformable obstruction portion movable in and out of a position interfering in end-to-end connected links to obstruct pivot rod movement and prevent displacement and removal of the pivot rod from a journalled position in the apertures when connecting two links end-to-end.

2. The combination defined in claim 1 wherein said flexibly deformable obstruction portion further comprises: flexible members for deforming by contact with the pivot rod during entry of the pivot rod into a journalled position in the apertures.

3. The combination defined in claim 1 wherein said flexibly deformable obstruction portion further comprises a finger like link end movably positionable in a position partly surrounding the pivot rod.

4. The combination defined in claim 1 wherein said flexibly deformable obstruction portion further moves between stable and unstable positions and obstructs pivot rod movement in the stable position.

5. The combination defined in claim 1 wherein said flexibly deformable obstruction portion further comprises means located on diametrically opposite sides of the pivot rod.

6. The combination defined in claim 1 wherein said flexibly deformable obstruction portion further comprises means located on only one side of the pivot rod.

7. In a modular plastic conveyor belt comprising a plurality of modular links pivotably connected end-to-end by means of pivot rods extending axially through apertures in intermeshed link ends on the end-to-end links, improved link end structure for reacting with the pivot rods, comprising in combination,
a member integrally affixed to one of the end-to-end links with a flexibly deformable portion positioning a stop element for intercepting a pivot rod to prevent insertion and removal of pivot rods into a journalled position connecting two links end-to-end, whereby the deformable portion is flexed for removing said stop element from the position intercepting the pivot rod.

8. A modular plastic conveyor belt link, comprising in combination,
a plurality of link ends defining apertures positioned along a pivot rod axis for journalling a pivot rod, said link adapted to intermesh with a similar link for end-to-end connection by means of a pivot rod having a body exhibiting a predetermined maximum perimeter dimension and a length for journalling axially through said apertures in intermeshed link ends for pivotably connecting links end to end in a conveyor belt, and forcibly deformable structure affixed to at least one link end in a position normally blocking said maximum perimeter dimension for obstructing movement of said pivot rod in and out of a journalled position within said apertures in intermeshed link ends, said deformable structure permitting flexing away from its normally blocking position sufficient to permit movement of a pivot rod into and out of a journalled position intermeshing link ends.

9. The link defined in claim 8 structured for obstructing a pivot rod which at said maximum perimeter dimension defines a retention head for positioning adjacent a link end without passing through said apertures, and further comprising means for positioning said forcibly deformable structure to confine the retention head in a position adjacent a link end in said position for obstructing movement.

10. In a modular plastic conveyor belt comprising a plurality of modular links pivotably connected end-to-end by means of pivot rods extending axially through apertures in intermeshed link ends on the end-to-end links, the improved pivot rod retention means for restricting the pivot rod movement out of place when journalled in the apertures, comprising in combination:
   integrally molded tab means disposed on at least one of the end-to-end connected links resiliently deformable for movement out of a normal position that restricts movement of the pivot rod.

11. The pivot rod retention means of claim 10 wherein said tab means further comprises structure for biasing the tab means into an interfering position to block as least one of said apertures to prevent the pivot rod from entering a journalled position in a normal operating position.

12. The pivot rod retention means of claim 10 wherein said tab means further comprises structure for retention in place with the pivot rod journalled in said apertures of a pivot rod head large enough that it will not pass through the apertures.

13. The pivot rod retention means of claim 10 wherein said tab means further comprises structure for retention of a headless pivot rod in place in a journalled position in the apertures.

14. The pivot rod retention means of claim 13 wherein said tab means further comprises structure for permitting a beveled end pivot rod to move the tab means from its normal position to permit entry of the pivot rod into a journalled position in the apertures.

15. The pivot rod retention means of claim 10 wherein said belt is disposed in a substantially planar work path and said tab means further comprises structure deformable away from the work path plane.

16. The pivot rod retention means of claim 10 wherein said tab means further comprises structure disposed on diametrically opposite sides of a pivot rod journalled in said apertures.

* * * * *